United States Patent
Teo Ron Han

(10) Patent No.: US 11,964,206 B2
(45) Date of Patent: Apr. 23, 2024

(54) METHOD FOR SHRINKING AN AREA IN BATTLE ROYALE GAMES

(71) Applicant: Garena Online Private Limited, Singapore (SG)

(72) Inventor: Harold Teo Ron Han, Singapore (SG)

(73) Assignee: Garena Online Private Limited, Singapore (SG)

( * ) Notice: Subject to any disclaimer, the term of this patent is extended or adjusted under 35 U.S.C. 154(b) by 0 days.

(21) Appl. No.: 18/193,920

(22) Filed: Mar. 31, 2023

(65) Prior Publication Data
US 2023/0310992 A1    Oct. 5, 2023

(30) Foreign Application Priority Data

Apr. 1, 2022   (SG) ........................... 10202203328V

(51) Int. Cl.
*A63F 13/5378* (2014.01)
*A63F 13/44* (2014.01)
*A63F 13/52* (2014.01)

(52) U.S. Cl.
CPC .......... *A63F 13/5378* (2014.09); *A63F 13/44* (2014.09); *A63F 13/52* (2014.09)

(58) Field of Classification Search
CPC ....... A63F 13/5378; A63F 13/44; A63F 13/52
See application file for complete search history.

(56) References Cited

U.S. PATENT DOCUMENTS

| 2004/0157662 | A1* | 8/2004 | Tsuchiya | A63F 13/5378 463/32 |
| 2016/0063799 | A1* | 3/2016 | Reeves | G07F 17/326 463/17 |
| 2016/0332074 | A1* | 11/2016 | Marr | A63F 13/60 |
| 2017/0329401 | A1* | 11/2017 | Mitchell | G06F 3/04842 |
| 2020/0298118 | A1* | 9/2020 | Yannakakis | G06N 3/045 |
| 2020/0306649 | A1* | 10/2020 | Aita | A63F 13/35 |

(Continued)

OTHER PUBLICATIONS

The Playzone. pubg.fandom.com. Online. Jan. 15, 2022. Accessed via the Internet. Accessed Aug. 3, 2023. <URL: https://pubg.fandom.com/wiki/The_Playzone?oldid=49804> (Year: 2022).*

(Continued)

*Primary Examiner* — Justin L Myhr
*Assistant Examiner* — Carl V Larsen
(74) *Attorney, Agent, or Firm* — Novak Druce Carroll LLP

(57) ABSTRACT

A method for shrinking an area in battle royale games is disclosed. The method comprises generating a map comprising a playing area, the playing area configured to shrink discontinuously at a variable shrinking rate, the variable shrinking rate having a default rate value. When it is determined that a shrink operation of the playing area is to be initiated, the method proceeds to determine whether a number of players currently alive in the game is equal to or lower than a threshold value. In response to determining that the number of players currently alive in the game is equal to or lower than the threshold value, the variable shrink rate is increased to a rate value greater than the default rate value to obtain an increased shrink rate, and the playing area shrinks from a first configuration to a second configuration in accordance with the increased shrink rate.

20 Claims, 12 Drawing Sheets

(56) References Cited

U.S. PATENT DOCUMENTS

| | | | |
|---|---|---|---|
| 2021/0060433 A1* | 3/2021 | Projansky | A63F 13/92 |
| 2022/0040583 A1* | 2/2022 | Li | G06T 11/60 |
| 2023/0133886 A1* | 5/2023 | Hur | A63F 13/533 |
| | | | 463/24 |

OTHER PUBLICATIONS

Shaver, Morgan. Ap.hyperxgaming.com. Sanhok map releases to PUBG this Friday. Online. Jun. 19, 2018. Accessed via the Internet. Accessed Aug. 3, 2023. <URL: https://ag.hyperxgaming.com/article/4471/sanhok-map-coming-to-pubg-pc-test-server> (Year: 2018).*

PUBG: Battlegrounds. Wikipedia.org. Online. Mar. 22, 2022. Accessed via the Internet. Accessed Aug. 3, 2023. <URL: https://en.wikipedia.org/w/index.php?title=PUBG:_Battlegrounds&oldid=1078939957> (Year: 2022).*

Bornander. Circles within circle (PUBG safe zone). gamedev.stackexchange.com. Online. Aug. 12, 2017. Accessed via the Internet. Accessed Aug. 3, 2023. <URL: https://gamedev.stackexchange.com/questions/147084/circles-within-circle-pubg-safe-zone> (Year: 2017).*

Alex Gibson, Mavericks: Proving Grounds is a 1000 Player Battle Royale Game with Serious Potential; Full Q&A Interview, Twinfinite, dated Apr. 17, 2018.

Robin Harrison, Esports—skill, chance, and everything inbetween: Part 2, iGB, dated Jan. 14, 2021.

Taimur Shabbir, The Ebb and Flow of a Battle Royale Game or: A Guide To Sucking Less Through Pretty Graphs, Medium, dated May 2, 2020.

* cited by examiner

METHOD FOR SHRINKING AN AREA IN BATTLE ROYALE GAMES

CROSS-REFERENCE TO RELATED APPLICATIONS

This patent application claims the benefit and priority of Singaporean Patent Application No. 10202203328V filed with the Intellectual Property Office of Singapore on Apr. 1, 2022, the disclosure of which is incorporated by reference herein in its entirety as part of the present application.

FIELD OF THE INVENTION

The invention pertains to electronic games, and in particular, a method for shrinking an area in battle royale games.

BACKGROUND

A battle royale game is an online multiplayer game genre that pits a number of players (or teams) against one another for survival and the last survivor of a match becomes the winner. Players in a battle royale game are usually not visually marked or distinguishable either on-screen or on the map. Thus, each player is required to travel around the map and rely on their own eyes and ears to locate enemies (e.g., opposing players). One reason battle royale games have gained popularity is because players enjoy the thrill of fighting off multiple enemies in quick succession to become the last man (or team) standing.

Typically, players are not allowed to respawn after they are eliminated in the game. As the game progresses and more players are eliminated from a static map, the decreasing player density (or population density) on the map inversely increases the time and effort needed by a surviving player to locate an enemy. For example, when only a small number of players remain alive in the game, some of the surviving players will be required to spend more time travelling around the map before being close enough to locate and engage an enemy. The decreasing number of enemy engagements per minute, and increasing length of time spent looking for an enemy negatively impacts gaming experience. For example, as the small number of surviving players roam the map in search of enemies, the lack of enemy engagements for an extended period of time makes the game boring for these surviving players. Although some battle royale games have attempted to reduce the size of the playing area during gameplay by continuously shrinking the playing area at a constant shrink rate, the constant shrink rate does not take into account the rate at which the number of surviving players decreases during a game (or match). Therefore, players will still experience a lack of enemy engagements for an extended period of time in instances where the number of surviving players decreases much faster than the constant shrink rate of the playing area.

What is thus required is a method for shrinking the battlefield which addresses the above problems by shrinking the battlefield at variable intervals and shrink rates that are determined by the number of players alive in the game at different points in time during gameplay, thereby timely and effectively corralling the decreasing number of surviving players into a smaller sized playing area to facilitate engagements between the surviving players as the game progresses. Furthermore, other desirable features and characteristics will become apparent from the subsequent detailed description and the appended claims, taken in conjunction with the accompanying drawings and this background of the disclosure.

SUMMARY OF INVENTION

According to a first aspect of the present invention, a method for shrinking an area in battle royale games is described, the method comprising generating a map that comprises a playing area, the playing area configured to shrink discontinuously at a variable shrinking rate, the variable shrinking rate having a default rate value. The method determines that a shrink operation of the playing area is to be initiated. In response to determining that the shrink operation of the playing area is to be initiated, the method proceeds to determine whether a number of players alive in the game at a time when the shrink operation of the playing area is to be initiated, is equal to or lower than a threshold value. In response to determining that the number of players alive in the game at the time when the shrink operation of the playing area is to be initiated is equal to or lower than the threshold value, the method increases the variable shrink rate to a rate value greater than the default rate value to obtain an increased shrink rate. The method further comprises performing the shrink operation to shrink the playing area from a first configuration to a second configuration in accordance with the increased shrink rate, wherein a speed at which the playing area shrinks from the first configuration to the second configuration in accordance with the increased shrink rate, is faster than a speed at which the playing area shrinks from the first configuration to the second configuration in accordance with the default rate value of the variable shrinking rate.

Preferably, the playing area is further configured to remain in the second configuration for a variable time interval having a default time period after completing the shrinking to the second configuration. The method further comprises determining that the playing area has completed shrinking to the second configuration. In response to determining that the playing area has completed shrinking to the second configuration, the method proceeds to determine whether a number of players alive in the game at a time when the playing area has completed shrinking to the second configuration, is equal to or lower than the threshold value. In response to determining that the number of players alive in the game at the time when the playing area has completed shrinking to the second configuration is equal to or lower than the threshold value, the method shortens the variable time interval to a time period shorter than the default time period to obtain a shortened time period. The method further comprises maintaining the playing area in the second configuration for the shortened time period.

Preferably, the shrink operation is a first shrink operation of a plurality of shrink operations to be performed during a match.

Preferably, the step of determining that the first shrink operation of the playing area is to be initiated comprises determining when a predetermined time period from the start of the match elapses, and in response to determining that the predetermined time period has elapsed from the start of the match, determining that the first shrink operation is to be initiated.

Preferably, the threshold value is a value selected from a plurality of threshold values.

Preferably, each of the plurality of threshold values is associated with a different shrink operation of the plurality of shrink operations.

Preferably, the shrink operation is a second shrink operation of a plurality of shrink operations to be performed during a match, and the playing area is being maintained in the first configuration for a variable time interval.

Preferably, the step of determining that the second shrink operation of the playing area is to be initiated comprises determining when the variable time interval elapses, and in response to determining that the variable time interval has elapsed, determining that the second shrink operation is to be initiated.

Preferably, the second configuration of the playing area is within an area previously occupied by the first configuration of the playing area.

Preferably, the rate value of the increase shrink rate is at least 2 times faster than the default rate value.

Preferably, the shortened time period is at least half the length of the default time period.

Preferably, the first configuration of the playing area comprises a circle shape having a first size and the second configuration of the playing area comprises a circle shape having a second size smaller than the first size.

According to a second aspect, the present invention provides a system comprising one or more computers and one or more storage devices storing computer-readable instructions that, when executed by the one or more computers, cause the one or more computers to perform all steps of any of the above-described methods. The same applies to one or more non-transitory computer storage media storing instructions that, when executed by one or more computers, cause the one or more computers to perform any of the above-described methods. The method can thus be easily transferred to other systems and carried out there.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Figure 1A:
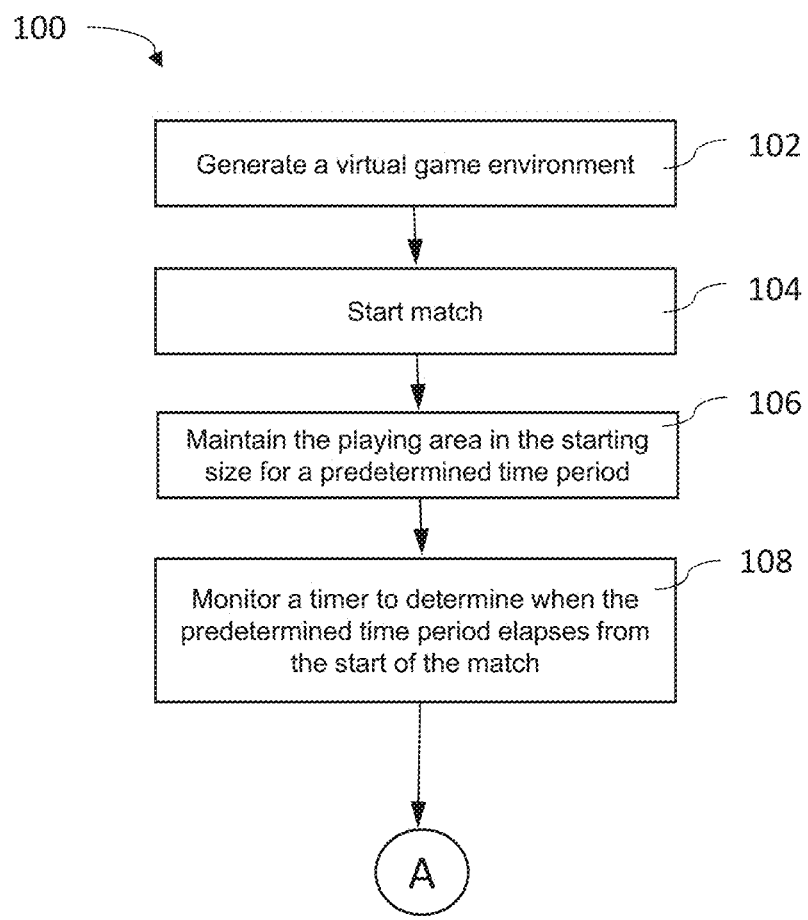
FIGS. 1a-1f is a flowchart showing a method 100 for shrinking an area in an electronic game according to certain embodiments.
Figure 1B:
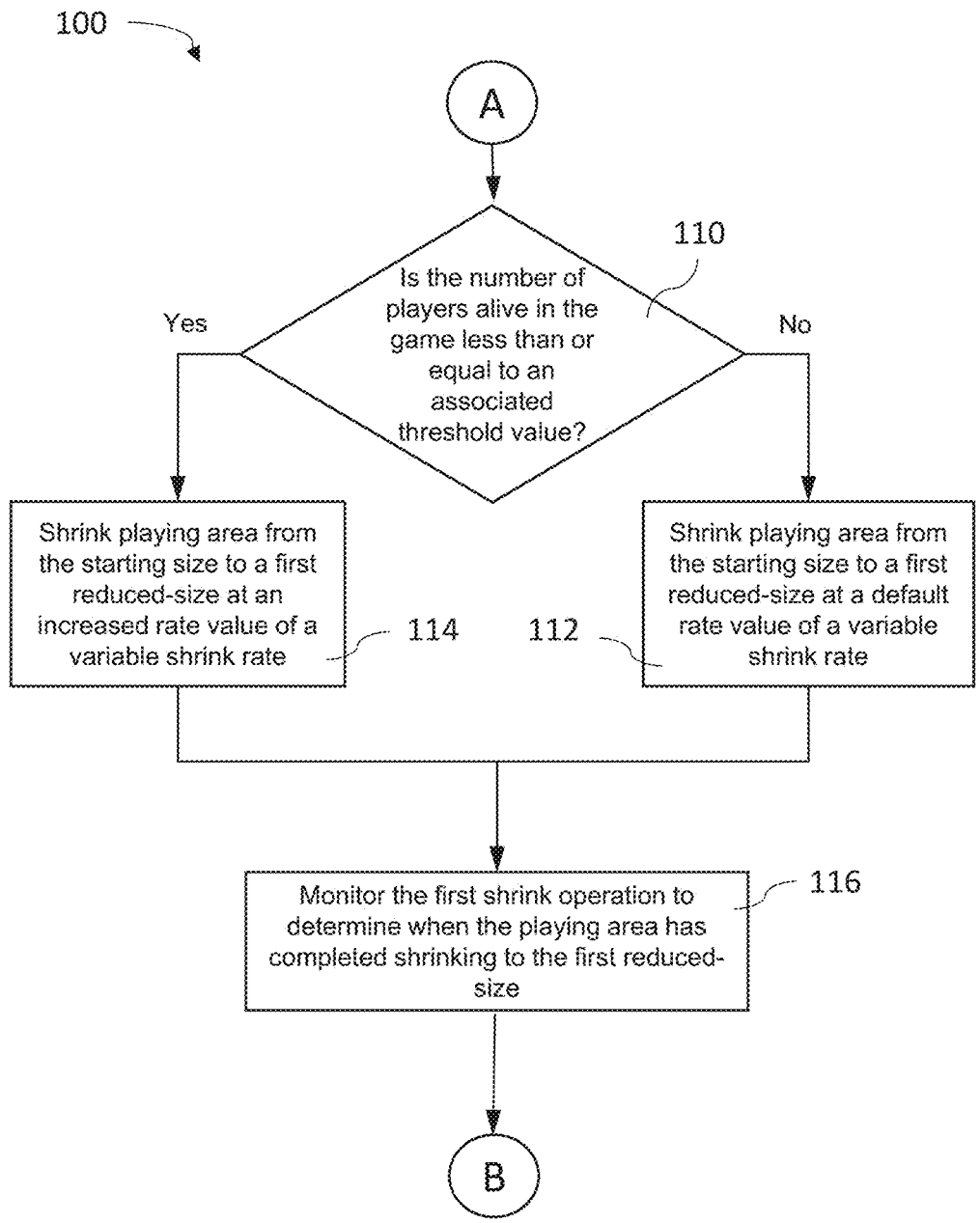
Figure 1C:
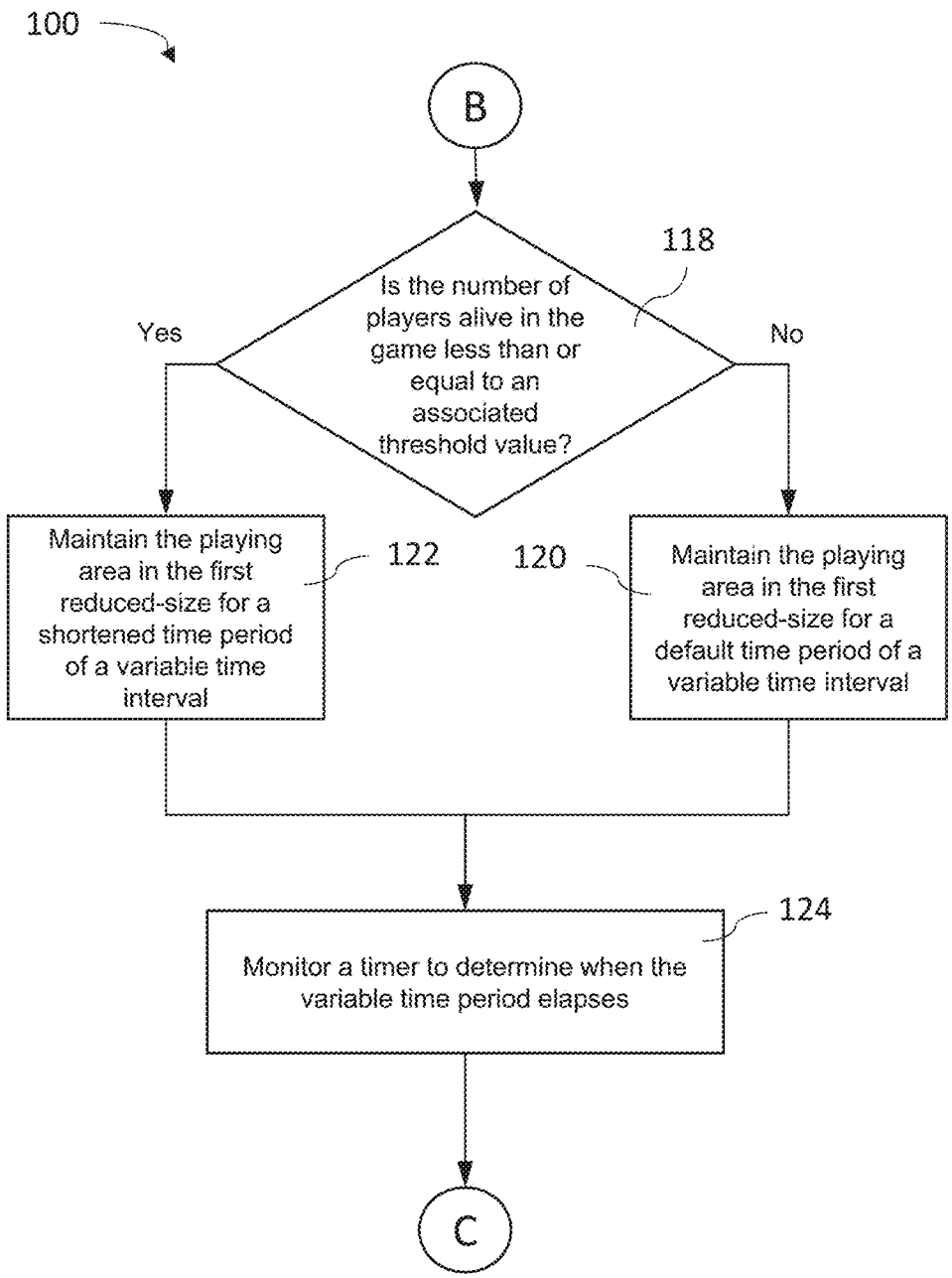

Skilled artisans will appreciate that elements in the figures are illustrated for simplicity and clarity and have not necessarily been depicted to scale. For example, the dimensions of some of the elements in the block diagrams or steps in the flowcharts may be exaggerated relative to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a method for shrinking a playing area in a battle royale game. In some embodiments, the method described herein is configured with a variable time interval between shrink operations, and/or a variable shrink rate for each shrink operation, to adjust the pace at which the playing area shrinks in accordance with the decreasing number of players that remain alive at different time points during gameplay. Players outside of the playing area will automatically be dealt damage repeatedly by a damage dealing mechanism, and will therefore be motivated to always stay within the playing area. For example, the method determines the number of surviving players at different points in time during gameplay and conditionally increases the shrink rate of each shrink operation based on the determined number of surviving players. In another example, the method determines the number of surviving players at different points in time during gameplay, and conditionally decreases the time interval between two shrink operations. By taking into account the number of surviving players at different points in time during gameplay, the method is able to advantageously accelerate the shrinking of the playing area as necessary to facilitate engagements (or encounters) between surviving players even in instances when the number of surviving players (or player density) decreases at a pace that is faster than anticipated.

In contrast, the prior art teaches continuously shrinking the playing area at a fixed speed, regardless or irrespective of the pace at which the number of surviving players decreases during gameplay. Therefore, the scheme of shrinking the playing areas (be it time interval or shrink rate) will be the same regardless of whether there are 2 surviving players or 20 surviving players remaining (e.g., out of a total of 50 players) shortly after the start of the game. This can therefore lead to more moments of "lull activity", especially when the number of surviving players decreases rapidly, making the game less engaging and less exciting as the game progresses. The dynamic nature of the present invention advantageously mitigates these moments of lull activity, and makes the game progress faster by promoting player engagements. The present invention adapts to the unpredictable pace at which the number of surviving players decreases during gameplay so as to consistently promote player encounters, even when the number of surviving players decreases rapidly, thereby ensuring that the game keeps moving forward so that the players maintain their excitement and enjoyment of the game throughout.

Furthermore, the method described herein is configured to discontinuously shrink the playing area so as to balance the need to reduce the playing area when the player density decreases, with the need to provide a suitably sized playing area to accommodate different playstyles (e.g., aggressive, defensive, and passive) and strategies. For example, it is contemplated that continuously shrinking the playing area without regard to the number of players alive in the game would unfairly favour players skilled in aggressive playstyles (e.g., players who seek to rush towards enemies during an engagement) when player density decreases slower than the shrink rate. Therefore, after a shrink operation is performed to shrink the playing area to a smaller size (or reduced-size), the method temporarily maintains the playing area in the reduced-size to provide players with sufficient space and time to employ different playstyles and strategies while still facilitating engagements between surviving players.

FIGS. 1a-1f is a flowchart showing a method 100 for shrinking an area in an electronic game according to certain embodiments. In some embodiments, the game is an online multiplayer game involving a plurality of players, each controlling their own avatar. The game is, for example, a battle royale game. The steps illustrated in FIGS. 1a-1f may be embodied in hardware or software including a computer-readable storage medium including instructions executable by the likes of a processor in a computing device.

In step 102, the method generates a virtual game environment (hereinafter "game environment") in a video game system or module. For example, the method generates a game environment for a game session (hereinafter "match") of the battle royale game. The game environment may be a game level or world associated with battle royale games. In some embodiments, the game environment may be displayed from a game viewpoint relative to the player's avatar (e.g., first-person viewpoint or third-person viewpoint). The game environment may be displayed on a display screen of an electronic device, such as but not limited to a mobile device, a personal computer, a game console, and a television. When each player maneuvers the avatar around the game environment, the display of the game environment may be adjusted to reflect the changes around the player's avatar. In some embodiments, the game is configured to include a game map, which provides an overhead view of the game environment. The game environment, for example, includes a first area corresponding to land (or ground) and optionally a second area corresponding to the sea.

In step 104, the match of the game starts. In some embodiments, the match starts with n number of players, where n represents a permitted number of players in a match of the game. For example, n is variable within a permitted number range having an upper limit and a lower limit. In one embodiment, n is any integer ranging from 20 to 100. In a non-limiting example, the match starts with 50 players. It should be appreciated that the permitted number of players in a match can be any suitable number depending on the game configuration.

In some embodiments, avatars' of the plurality of players (e.g., 50 players) participating in the match are placed randomly within a playing area of the game environment when the match starts. The playing area may correspond to a safe area in the game environment. For example, the playing area is an area protected from a damage dealing mechanism. For example, avatars positioned within the playing area will not be affected by the damage dealing mechanism. Thus, the game encourages players to constantly position their avatars within the playing area. For example, when an avatar of a player is detected as being positioned outside the playing area, the game is configured to automatically deal damage repeatedly to the avatar outside the playing area. Alternatively, the game may be configured to automatically eliminate an avatar from the match when it is detected as being positioned outside the playing area. In some embodiments, the method is configured to provide the playing area with a starting size at the start of the match. For example, the starting size of the playing area encompasses the entire game environment.

In step 106, the method maintains the playing area in the starting size for a predetermined time period. For example, the playing area does not shrink immediately after the match starts. In one embodiment, the playing area is temporarily maintained in the starting size for a predetermined time period from the start of the match. In a non-limiting example, the predetermined time period is 2 minutes from the start of the match. It should be appreciated that the predetermined time period can be any suitable length of time depending on the game configurations or objectives. For example, the game may be configured to provide multiple supply boxes (or items) randomly placed throughout the game environment in a match, and the predetermined time period may be a length of time sufficient to allow the players to explore the game environment for an opportunity to acquire one or more supply boxes. In another example, the predetermined time period may be a sufficiently short length of time to allow a player an opportunity to locate and engage at least one enemy without allowing players to experience a lack of enemy engagements for an extended period of time (e.g., more than 2 minutes).

In step 108, the method monitors a timer to determine when the predetermined time period elapses from the start of the match. The method may include one or more internal timers for counting the various time periods described herein. In some embodiments, the method determines that a shrink operation is to be initiated when it is determined that the predetermined time period from the start of the match elapses. For example, at the end of the predetermined time period, the method determines that a shrink operation for shrinking the playing area is to be initiated. The method is configured to shrink the playing area discontinuously during gameplay. For example, the method performs a plurality of shrink operations to shrink the playing area to a predetermined number of reduced-sizes in sequential order. The plurality of shrink operations may include a predetermined number of shrink operations.

In step 110, the method includes determining whether the number of players currently alive in the game is less than or equal to an associated threshold value when it is determined that a shrink operation is to be initiated. For example, the step of determining whether the number of players currently alive in the game is less than or equal to an associated threshold value is performed instantly or near-instantly upon determining that a shrink operation is to be initiated. As used herein, the term "threshold value" refers to a value from a set of threshold values configured to determine both a shrink rate of each shrink operation and a time interval between shrink operations. Each threshold value of the set of threshold values may be sequentially associated to a corresponding shrink operation (of the predetermined number of shrink operations) as will be described in further detail below.

In some embodiments, the shrink operation to be performed in step 112 or step 114 is a first shrink operation associated with a first threshold value (of the set of threshold values). For example, in step 110, the method determines whether the number of players currently alive the game is less than or equal to the first threshold value when it is determined that a first shrink operation for shrinking the playing area is to be initiated.

In some embodiments, the method proceeds from step 110 to step 112 when it is determined that the number of players currently alive in the game is more than the first threshold value.

In step 112, the method initiates the first shrink operation for shrinking the playing area from the starting size to a first reduced-size at the default rate value of a variable shrink rate. For example, the shrink operation performed in step 112 is the first shrink operation of a sequence of shrink operations to be performed by the method. The term "shrink rate" refers to the speed at which the playing area shrinks. The parameters of each shrink operation include a variable shrink rate configured with a default rate value. The default rate value is, for example, an unadjusted rate value of the variable shrink rate. In one embodiment, the default rate value corresponds to a minimum rate value of the variable shrink rate. The default rate value may also be referred to as the default shrink rate. In a non-limiting example, the time it takes for the playing area to complete a shrink operation with the default shrink rate is 10 seconds. For example, the first shrink operation shrinks the playing area from the starting size to the first reduced-size gradually over 10 seconds at the default shrink rate. The method continues to step 116.

In other embodiments, the method proceeds from step 110 to step 114 when it is determined that the number of players currently alive in the game is less than or equal to the first threshold value.

In step 114, the method initiates the first shrink operation for shrinking the playing area from the starting size to the first reduced-size at an increased rate value of the variable shrink rate. For example, the shrink operation performed in step 114 is the first shrink operation of a sequence of shrink operations to be performed by the method, and the parameters of each shrink operation include a variable shrink rate configured with default rate value. When it is determined that the number of players currently alive in the game is less than or equal to the first threshold value, the method automatically increases the variable shrink rate to obtain a rate value greater than the default rate value. For example, the rate value of the variable shrink rate is increased from the default rate value to obtain an increased rate value, which may also be referred to as an increased shrink rate. Performing the first shrink operation with the increased shrink rate reduces the time it takes to complete said shrink operation as compared to performing said shrink operation with the default shrink rate. The use of an increased shrink rate advantageously accelerates the pace at which the players are corralled into a smaller playing area, thereby promoting player engagement while mitigating lull moments, and increasing the enjoyment factor of the game.

In some embodiments, the rate value of the variable shrink rate may be increased to about 10%, 20%, 30%, 40%, 50%, 60%, 70%, 80%, 90%, or 100% greater than the default rate value (or default shrink rate). Other configurations of the increased shrink rate may also be useful. For example, the variable shrink rate may also be increased to about 2 times, 3 times, 4 times, or 5 times greater than the default rate value. In one embodiment, the increased shrink rate is at least 2 times greater than the default shrink rate. In a non-limiting example, the time it takes for the playing area to complete a shrink operation at the increased shrink rate is 5 seconds. For example, the first shrink operation shrinks the playing area from the starting size to the first reduced-size gradually over 5 seconds at the increased shrink rate. The method continues to step 116.

Proceeding further to step 116, the method monitors the first shrink operation to determine when the playing area has completed shrinking to the first reduced-size. In some embodiments, the first reduced-size playing area is configured to encompass a portion of the game environment. For example, the first reduced-size playing area is smaller than the game environment and encompasses a randomly-selected portion of the game environment.

In step 118, the method includes determining whether the number of players currently alive in the game is less than or equal to an associated threshold value when it is determined that the playing area has completed shrinking to the first reduced-size. For example, the step of determining whether the number of players currently alive in the game is less than or equal to an associated threshold value is performed instantly or near-instantly upon determining that the playing area has completed shrinking to a smaller size. The first shrink operation ends when the playing area completes shrinking to the first reduced-size. In one embodiment, the associated threshold value is the first threshold value (of the set of threshold values). For example, the first threshold value is associated with a start and an end of the first shrink operation.

In some embodiments, the method proceeds from step 118 to step 120 when it is determined that the number of players currently alive in the game is more than the first threshold value.

In step 120, the method maintains the playing area in the first reduced-size for a default time period of a variable time interval. For example, the playing area temporarily stops shrinking immediately after the first shrink operation is completed (or ends). The term "time interval" refers to the waiting time for a subsequent shrink operation to initiate. The parameters of each shrink operation includes a variable time interval configured with a default time period. The default time period is, for example, an unadjusted time period of the variable time interval. In one embodiment, the default time period corresponds to a maximum time period of the variable time interval. The default time period may also be referred to as the default time interval. In a non-limiting example, the playing area is temporarily maintained in the first reduced-size for a default time interval of 2 minutes. The method continues to step 124.

In other embodiments, the method proceeds from step 118 to step 122 when it is determined that the number of players currently alive in the game is less than or equal to the first threshold value.

In step 122, the method maintains the playing area in the first reduced-size for a shortened time period of the variable time interval. For example, the playing area temporarily stops shrinking immediately after the first shrink operation is completed (or ends). The parameters of each shrink operation includes a variable time interval configured with a default time period. When it is determined that the number of players currently alive in the game is less than or equal to the first threshold value, the method automatically reduces the variable time interval to obtain a time period shorter than the default time period. For example, the time period of the variable time interval is reduced from the default time period to obtain a shortened time period, which may also be referred to as a shortened time interval. The shortened time interval reduces the waiting time for performing a subsequent shrink operation as compared to the default time interval. The use of a shortened time period thereby advantageously accelerates the overall pace of the game by reducing the waiting time in-between shrink operations, which translates to better player engagement, less lull moments, and improved enjoyment factor of the game.

In some embodiments, the time period of the variable time interval may be reduced to about 10 seconds, 20 seconds, 30 seconds, 40 seconds, 50 seconds, 60 seconds, 70 seconds, 80 seconds, 90 seconds, 100 seconds, 110 seconds, or 120 seconds shorter than the default time period. Other configurations of the shortened time period may also be useful. For example, the variable time interval may also be reduced to about 0.75 times, 0.5 times, or 0.25 times shorter than the default time period. In one embodiment, the shortened time period is at least 0.5 times less than the default time period. In a non-limiting example, the playing area is temporarily maintained in the first reduced-size for a shortened time period of 1 minute. The method continues to step 124.

Proceeding further to step 124, the method monitors a timer to determine when the variable time interval elapses. For example, the method determines when the default time period (or the shortened time period, as the case may be) elapses from the start of maintaining the playing area in the first reduced-size. In some embodiments, the method determines that a subsequent shrink operation is to be initiated when it is determined that the variable time interval has elapsed. For example, at the end of the default time period or the shortened time period, the method determines that a subsequent shrink operation to further shrink the playing area is to be initiated.

In step 126, the method includes determining whether the number of players currently alive in the game is less than or equal to an associated threshold value when it is determined that a subsequent shrink operation is to be initiated. As used herein, the term "subsequent shrink operation" refers to each of a plurality of shrink operations to be performed after the first shrink operation, and includes a final (or last) shrink operation. The plurality of shrink operations may be sequentially connected. For example, the method may include assigning sequence identification numbers to each of the plurality of shrink operations, including the first shrink operation, to determine the sequence identity of the subsequent shrink operation. In a non-limiting example, the subsequent shrink operation may correspond to a second shrink operation, third shrink operation, fourth shrink operation, fifth shrink operation, sixth shrink operation, or seventh shrink operation, as appropriate. For example, steps 126 through 132 is repeated until the subsequent shrink operation corresponds to a final shrink operation. It should be appreciated that the method can be configured to include any suitable number of shrink operations as necessary.

In some embodiments, the subsequent shrink operation to be performed is a second shrink operation associated with a second threshold value (of the set of threshold values). For example, in step 126, the method determines whether the number of players currently alive the game is less than or equal to a second threshold value when it is determined that a second shrink operation for further shrinking the playing area is to be initiated.

In some embodiments, the method proceeds from step 126 to step 128 when it is determined that the number of players currently alive in the game is more than the second threshold value.

In step 128, the method initiates a subsequent shrink operation for shrinking the playing area to a subsequent reduced-size at the default rate value of the variable shrink rate. As used herein, the term "subsequent reduced-size" refers to each of a plurality of predetermined reduced-sizes smaller than the first reduced-size, and includes a final (or last) reduced-size. The plurality of reduced-sizes may be sequentially connected. For example, the method may include assigning sequence identification numbers to each of the predetermined reduced-sizes, including the first reduced-size, to determine the sequence identity of the subsequent reduced-size. In a non-limiting example, the subsequent reduced-size may correspond to a second reduced-size, third reduced-size, fourth reduced-size, fifth reduced-size, or sixth reduced-size, as appropriate. For example, steps 134 through 140 is repeated until the subsequent reduced-size corresponds to a final reduced-size. It should be appreciated that the method can be configured to include any suitable number of reduced-size playing area as necessary.

In some embodiments, the subsequent shrink operation initiated by the method as per step 128 is a second shrink operation for shrinking the playing area from the first reduced-size to a second reduced-size at the default rate value of the variable shrinking rate. For example, the subsequent shrink operation is the second shrink operation of a sequence of shrink operations to be performed by the method. The default rate value is, for example, an unadjusted rate value of the variable shrink rate. In one embodiment, the default rate value (or default shrink rate) corresponds to a minimum rate value of the variable shrink rate. In a non-limiting example, the time it takes for the playing area to complete a subsequent shrink operation with the default shrink rate is 10 seconds. For example, a second shrink operation shrinks the playing area from the first reduced-size to the second reduced-size gradually over 10 seconds at the default shrink rate. The method continues to step 132.

In other embodiments, the method proceeds from step 126 to step 130 when it is determined that the number of players currently alive in the game is less than or equal to the second threshold value.

In step 130, the method initiates a subsequent shrink operation for shrinking the playing area to a subsequent reduced-size at the increased rate value of the variable shrink rate. In one embodiment, the subsequent shrink operation initiated by the method as per step 130 is a second shrink operation for shrinking the playing area from the first reduced-size to a second reduced-size. When it is determined that the number of players currently alive in the game is less than or equal to the second threshold value, the method automatically increases the variable shrink rate to obtain a rate value greater than the default rate value. For example, the rate value of the variable shrink rate is increased from the default rate value to obtain an increased rate value (or increased shrink rate). Performing a specific subsequent shrink operation (e.g., the second shrink operation) with the increased shrink rate reduces the time it takes to complete said subsequent shrink operation as compared to performing said subsequent shrink operation with the default shrink rate. The use of an increased shrink rate advantageously accelerates the pace at which the players are corralled into a smaller playing area, thereby promoting player engagement while mitigating lull moments, and increasing the enjoyment factor of the game. The method continues to step 132.

Proceeding further to step 132, the method monitors the subsequent shrink operation to determine when the playing area has completed shrinking to the relevant subsequent reduced-size. The subsequent reduced-size playing area may be configured to encompass a portion of the first reduced-size playing area. In one embodiment, the subsequent reduced-size is a second reduced-size. For example, the second reduced-size playing area is smaller than the first reduced-size playing area and encompasses a randomly-selected portion of the first reduced-size playing area.

In step 134, the method includes determining whether the number of players currently alive in the game is less than or equal to an associated threshold value when it is determined that the playing area has completed shrinking to the subsequent reduced-size. For example, the second shrink operation ends when the playing area completes shrinking to the second reduced-size. In one embodiment, the associated threshold value is the second threshold value (of the set of threshold values). For example, the second threshold value is associated with a start and an end of the second shrink operation.

In one embodiment, the method proceeds from step 134 to step 136 when it is determined that the number of players currently alive in the game is more than the associated threshold value (e.g., second threshold value).

In step 136, the method maintains the playing area in the subsequent reduced-size for a default time period (or default time interval). For example, the playing area temporarily stops shrinking immediately after the subsequent (e.g., second) shrink operation is completed. In a non-limiting example, the playing area is temporarily maintained in the subsequent (e.g., second) reduced-size for a default time interval of 2 minutes. The method continues to step 140.

In another embodiment, the method proceeds from step 134 to step 138 when it is determined that the number of players currently alive in the game is less than or equal to the associated threshold value (e.g., second threshold value).

In step 138, the method maintains the playing area in the subsequent reduced-size for a shortened time period. For example, the playing area temporarily stops shrinking immediately after the subsequent (e.g., second) shrink operation is completed. The parameters of each shrink operation include a variable time interval configured with a default time period. When it is determined that the number of players currently alive in the game is less than or equal to the associated threshold value (e.g., second threshold value), the method automatically reduces the variable time interval to obtain a time period shorter than the default time period. For example, the time period of the variable time interval is reduced from the default time period to obtain a shortened time period (or shortened time interval). The shortened time interval reduces the waiting time for performing a subsequent shrink operation as compared to the default time interval. The use of the shortened time period thereby advantageously accelerates the overall pace of the game by reducing the waiting time in-between shrink operations, which translates to better player engagement, less lull moments, and improved enjoyment factor of the game.

In one embodiment, the shortened time period is 0.5 times of the default time period. In a non-limiting example, the playing area is temporarily maintained in the subsequent reduced-size for a shortened time period of 1 minute. The method continues to step 140.

Proceeding further to step 140, the method monitors a timer to determine when the variable time interval elapses. For example, the method determines when the default time period (or the shortened time period, as the case may be) elapses from the start of maintaining the playing area in the relevant subsequent reduced-size. In some embodiments, the method determines that a next subsequent shrink operation is to be initiated when it is determined that the variable time interval has elapsed. For example, at the end of the default time period or the shortened period, the method determines that a next subsequent shrink operation to further shrink the playing area is to be initiated.

In step 142, the method includes determining whether the current size of the playing area corresponds to a final reduced-size. In one embodiment, method performs the plurality of shrink operations to sequentially shrink the playing area to a sixth reduced-size. For example, the final reduced-size is the sixth reduced-size.

In some embodiments, the method returns to step 126 from step 142 when it is determined that the current size of the playing area does not correspond to the final reduced-size. For example, if the current size of the playing area is the second reduced-size, the method returns to step 126 to repeat the process as described in steps 126 through 142 for shrinking the playing area to the next subsequent (e.g., third, fourth, fifth, sixth, etc.) reduced-sizes. The method may repeatedly perform steps 126 through step 142 until the playing area is in the final reduced-size (e.g., sixth reduced-size). For example, the method may continue the process as previously described to perform a third shrink operation, which is associated with a third threshold value (of the set of threshold values), to discontinuously shrink the playing area to a third reduced-size, and so on until the playing area shrinks to a final (e.g., sixth) reduced-size.

In some embodiments, the method proceeds from step 142 to 144 when it is determined that the current size of the playing area corresponds to a final reduced-size.

In step 144, the method shrinks the playing area at the default rate value of the variable shrink rate until the playing area disappears. For example, the method performs a last shrink operation to shrink the playing area from the final reduced-size until it eventually disappears from the game environment or display screen.

The method as described herein determines the number of surviving players at (or immediately before) the time of performing a specific shrink operation to conditionally increase the shrink rate of the specific shrink operation based on the determined number of surviving players. In addition, the invention also determines the number of surviving players at (or immediately after) the completion of a specific shrink operation to conditionally shorten the waiting time to perform the next shrink operation based on the determined number of surviving players. By taking into account the number of surviving players at the start and the end of each shrink operation, the method is able to readily accelerate the shrinking of the playing area when necessary to facilitate engagements (or encounters) between surviving players. This is especially beneficial in instances when the number of surviving players is decreasing at a rate that is faster than can be anticipated during a match.

Although the embodiments of the present disclosure are described in such a way that a same threshold value (from the set of threshold values) is used to determine both the shrink rate of a specific shrink operation and the time interval following completion of the specific shrink operation, it should be understood that the present disclosure is not limited to the embodiments. For example, different threshold values may also be used to determine the shrink rate of a specific shrink operation and the time interval following completion of the specific shrink operation.

Although the embodiments of the present disclosure are described in such a way that the step of determining whether the number of players currently alive in the game is less than or equal to an associated threshold value is performed when (or after) it is determined that a shrink operation is to be initiated, it should be understood that the present disclosure is not limited to the embodiments. In alternative embodiments, the step of determining whether the number of players currently alive in the game is less than or equal to an associated threshold value is performed before the step of determining that a shrink operation is to be initiated. For example, the method may be configured to determine whether the number of players currently alive in the game is less than or equal to an associated threshold value when it is determined that the predetermined time period from the start of the match, or the variable time interval from the start of maintaining the playing area in a reduced-size, has elapsed.

FIGS. 2a-2f show an exemplary game environment displayed from a game view in accordance with certain embodiments. The game view corresponds to a game (or match) being played on an electronic device. For example, the game view is rendered on a display screen of the electronic device. The electronic device may include a video game system or module. In some embodiments, the game is a multiplayer online game. For example, the game is a battle royale game and the game view is a top view of a game environment (e.g., a level or world) associated with battle royale games. For the purpose of explaining the disclosure, the depicted game view in FIGS. 2a-2f corresponds to a top view of a game map 200 (hereinafter "map"). For example, a player may access the map 200 after the start of a match to determine a current position of the player's avatar on the map. It should be appreciated that the game view may also be changed to the viewing perspective of the player's avatar. For example, the game environment may be displayed from a viewpoint relative to the player's avatar (e.g., first-person viewpoint or third-person viewpoint) during gameplay. The map 200 may be rendered on the display screen when a software product corresponding to the game is executed on one or more computing hardware of the electronic device.

Figure 2A:
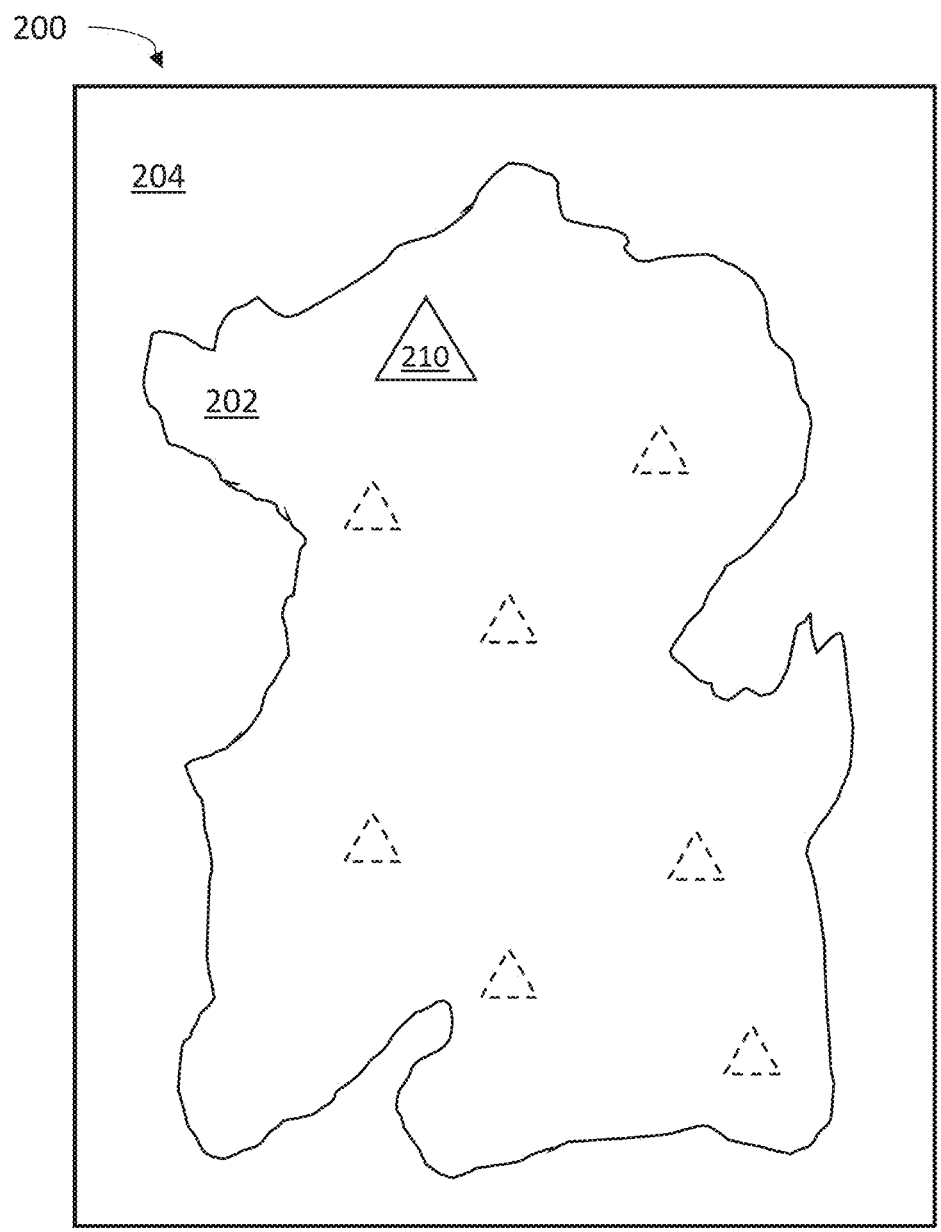
FIGS. 2a-2f show an exemplary game environment displayed from a game view in accordance with certain embodiments.

Referring to FIG. 2*a*, the game environment includes a first area 202 corresponding to land (or ground) and a second area 204 corresponding to the sea. In some embodiments, a match starts with a permitted number of players as described in step 104 of FIG. 1*a*. For ease of explanation, FIG. 2*a* shows a specific match starting with 8 players and the avatar of each player is represented by a triangle. As shown, the avatar of the player currently playing the game is represented by a solid line triangle 210 and the avatar of each competing player (or enemy) is represented by a broken line triangle. The 8 players participating in the specific match may be placed randomly within a playing area of the map. The playing area may correspond to a safe area in the game environment. In some embodiments, the match starts with the playing area in a starting size. For example, the starting size of the playing area encompasses the entire game environment. The playing area is maintained in the starting size for a predetermined time period.

Although the map 200 in FIG. 2*a* shows the position of all players starting the match for convenience of description, it should be appreciated that the map 200 may be configured to allow the player 210 to view the current position of his or her avatar on the map 200 while concealing the current positions of the enemies.

Figure 2B:
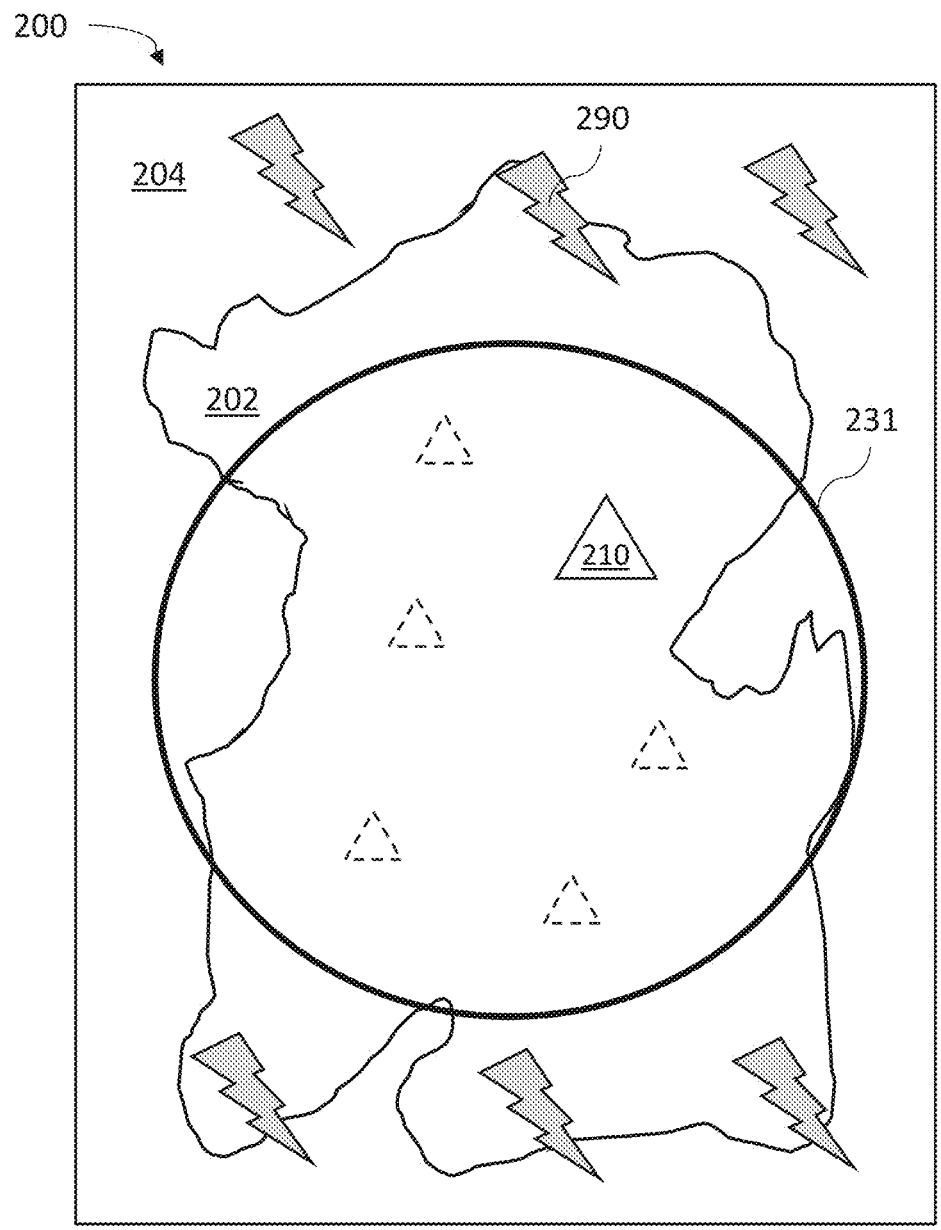

Referring to FIG. 2*b*, a first shrink operation is performed after the predetermined time period (e.g., 2 minutes) elapses from the start of the match. For example, the first shrink operation is performed to gradually shrink the playing area from the starting size (not shown) to a first reduced-size 231. In this example, the area enclosed by the solid line circle depicts the playing area. As described in step 110 of FIG. 1*b*, the invention determines whether the number of players currently alive in the game is less than or equal to an associated threshold value (of the set of threshold values) when it is determined that a first shrink operation is to be initiated. In this example, the number of players currently alive in the game (or surviving players) has decreased to six when it is determined that the first shrink operation is to be initiated.

In some embodiments, the parameters of a shrink operation include a variable shrink rate configured with a default rate value. As described in steps 112 and 114 of FIG. 1*b*, the first shrink operation is performed with the default shrink rate if it is determined that the number of surviving players (e.g., six) is more than the first threshold value. Alternatively, the first shrink operation is performed with the increased shrink rate if it is determined that the number of surviving players (e.g., six) is less than or equal to the first threshold value. The use of the increased shrink rate to perform the shrink operation advantageously confines the players to a smaller playing area at a faster pace, thereby promoting player engagement while mitigating lull moments, and increasing the enjoyment factor of the game.

The invention monitors the first shrink operation to determine when the playing area has completed shrinking to the first reduced-size 231. For example, the playing area temporarily stops shrinking immediately after the first shrink operation is completed. When it is determined that the playing area has completed shrinking to the first reduced-size 231, the invention proceeds to determine whether the number of players currently alive in the game is less than or equal to an associated threshold value. The associated threshold value for the first reduced-size 231 may be the same as the associated threshold value for the first shrink operation. For example, the associated threshold value is the first threshold value (of the set of threshold values). As described in steps 120 and 122 of FIG. 1*c*, the playing area is maintained in the first reduced-size 231 for a default time period (of the variable time interval) if it is determined that the number of surviving players (e.g., six) is more than the first threshold value. Alternatively, the playing area is maintained in the first reduced-size 231 for a shortened time period (of the variable time interval) if it is determined that the number of surviving players (e.g., six) is less than or equal to the first threshold value. The use of the shortened time period advantageously accelerates the overall pace of the game by reducing the waiting time in-between shrinking operations, which translates to better player engagement, less lull moments, and improved enjoyment factor of the game.

As shown, the playing area may be configured with a circle shape and viewable on the map 200. It should be appreciated that the playing area may also be configured with any other suitable shapes, including square and triangle shape. In some embodiments, the invention includes a damage dealing mechanism and the playing area corresponds to a safe area in the game environment. For example, avatars that are positioned within the playing area (or safe area) are protected from the damage dealing mechanism. In some embodiments, when an avatar of a player is detected as being positioned outside the playing area, the damage dealing mechanism is configured to automatically deal damage to the avatar outside the playing area. For example, the avatar repeatedly takes damage from the damage dealing mechanism for every second it stays outside the playing area. In an alternative embodiment, the game may be configured to automatically eliminate an avatar from the match when it is detected as being positioned outside the playing area. In this example, the lightning bolt symbols 290 indicate that the damage dealing mechanism is in an active state and is affecting the area encircling the playing area. Thus, the game encourages players to constantly position their avatars within the discontinuously shrinking playing area.

Figure 2C:
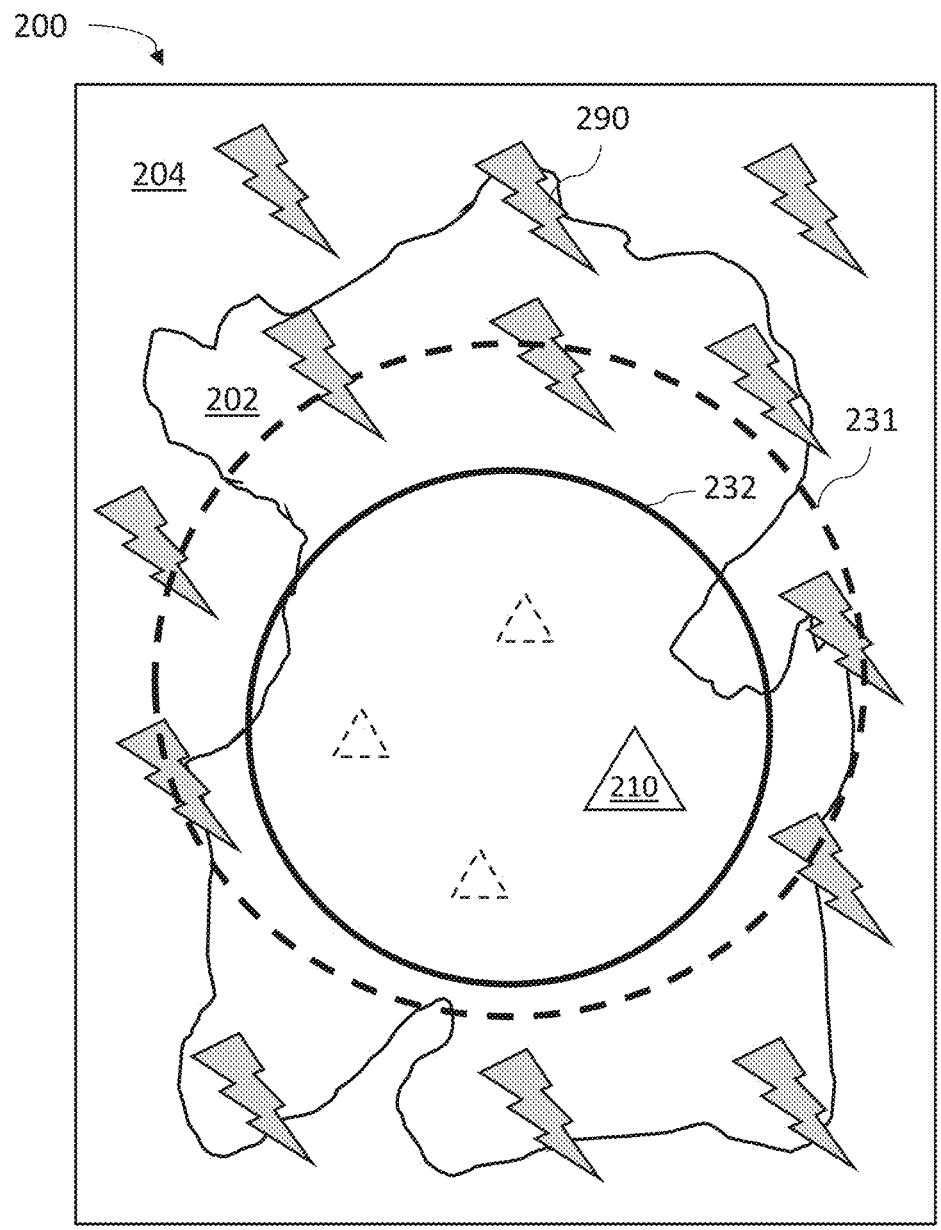

Referring to FIG. 2*c*, the method monitors a timer to determine when the variable time interval (e.g., the default time period or the shortened period, as the case may be) elapses from the start of maintaining the playing area in the first reduced-size 231. For example, at the end of the default time period or the shortened period, the method determines that a second shrink operation to further shrink the playing area is to be initiated. In some embodiments, the invention proceeds to determine whether the number of players currently alive in the game is less than or equal to an associated threshold value when it is determined that a second shrink operation is to be initiated. In this example, the number of surviving players has decreased to four when it is determined that a second shrink operation is to be initiated.

Figure 1D:
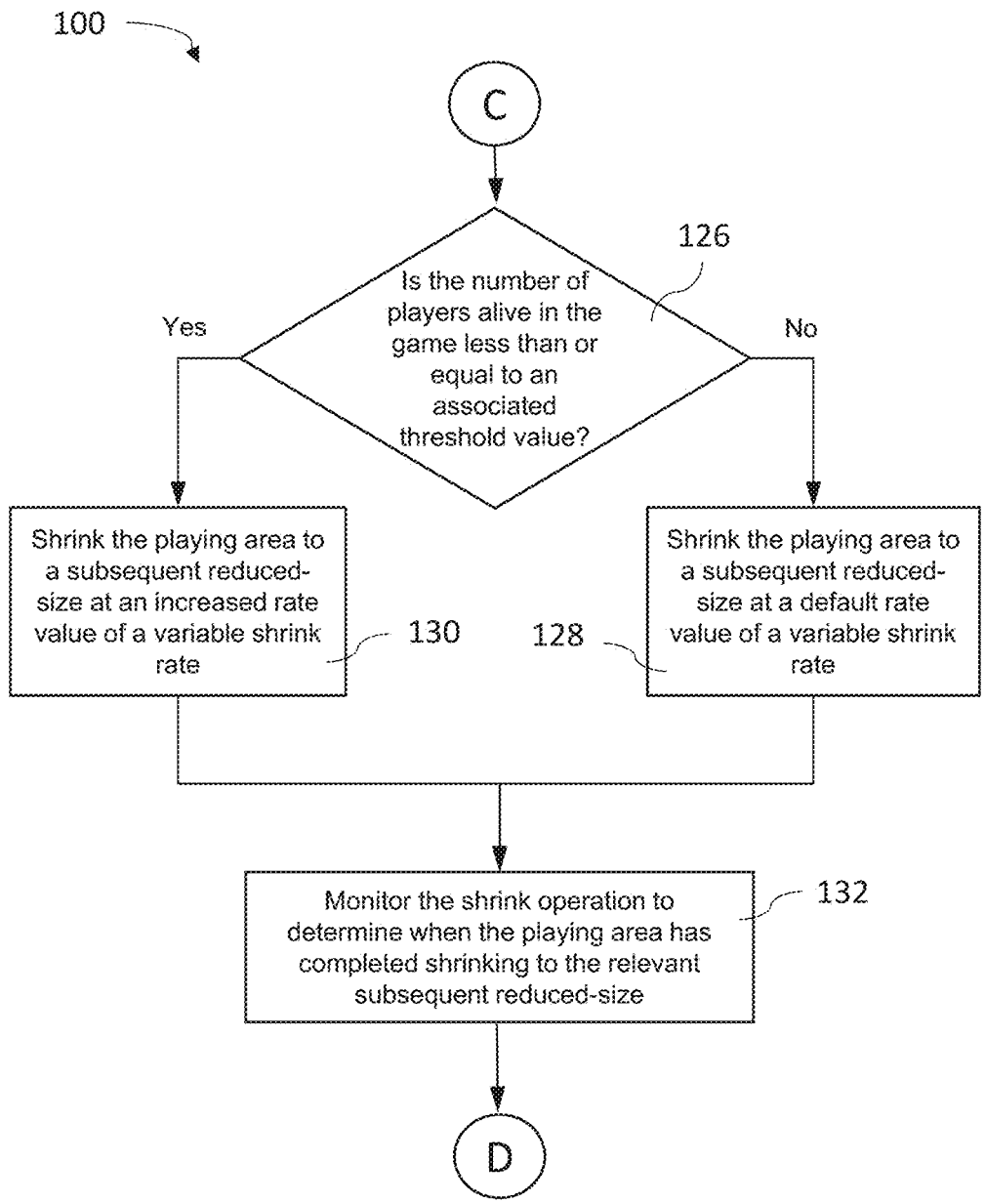

As per steps 128 and 130 of FIG. 1*d*, the second shrink operation is performed with the default shrink rate if it is determined that the number of surviving players (e.g., four) is more than the second threshold value. Alternatively, the second shrink operation is performed with the increased shrink rate if it is determined that the number of surviving players (e.g., four) is less than or equal to the second threshold value. The use of the increased shrink rate to perform the shrink operation advantageously confines the players to a smaller playing area at a faster pace, thereby promoting player engagement while mitigating lull moments, and increasing the enjoyment factor of the game.

The invention monitors the second shrink operation to determine when the playing area has completed shrinking from the first reduced-size 231 to the second reduced-size 232. For example, the playing area temporarily stops shrinking immediately after the second shrink operation is completed. When it is determined that the playing area has completed shrinking to the second reduced-size 232, the invention proceeds to determine whether the number of players currently alive in the game is less than or equal to an associated threshold value. The associated threshold value for the second reduced-size 232 may be the same as the associated threshold value for the second shrink operation. For example, the associated threshold value is the second threshold value (of the set of threshold values).

Figure 1E:
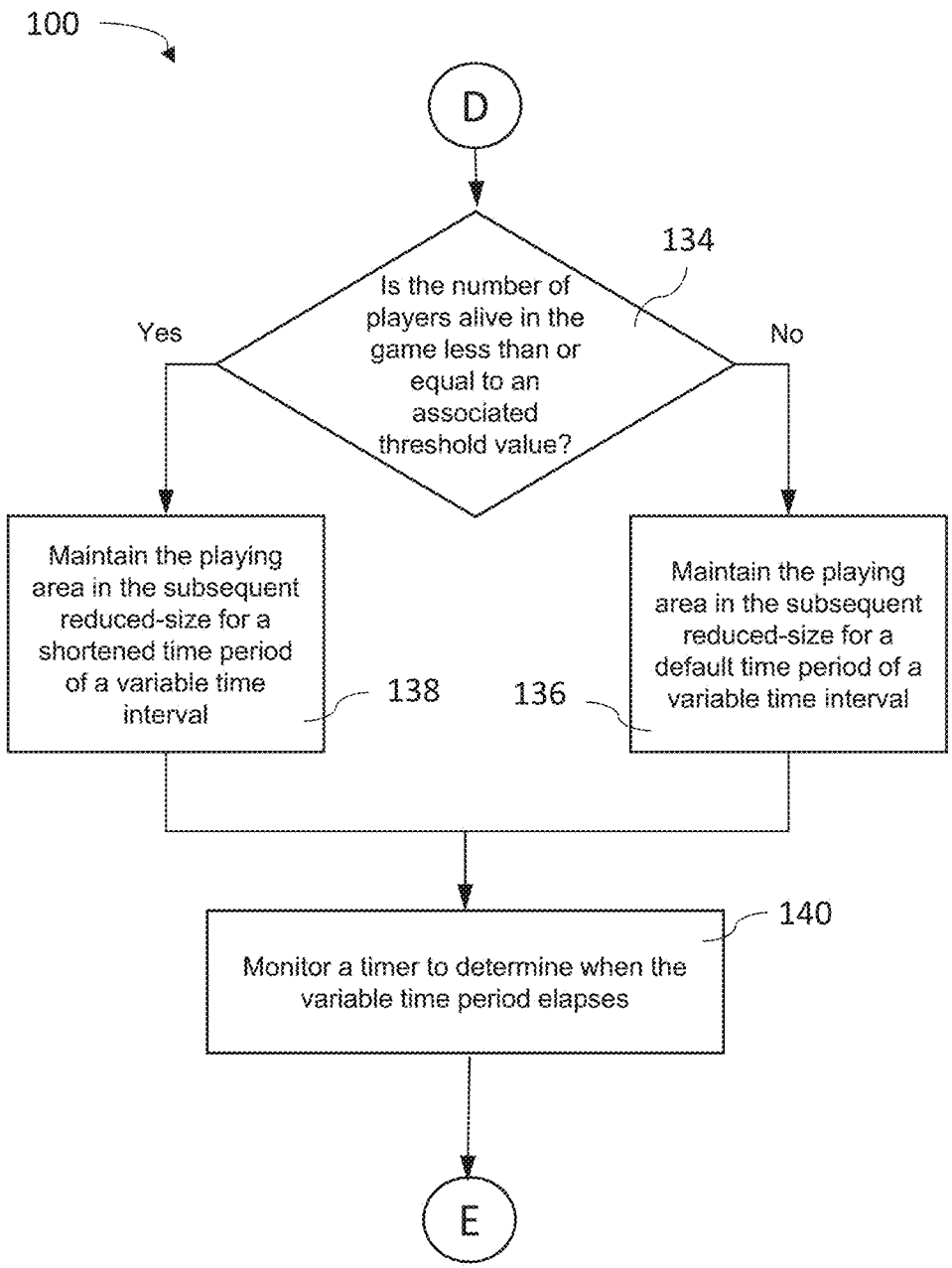
Figure 1F:
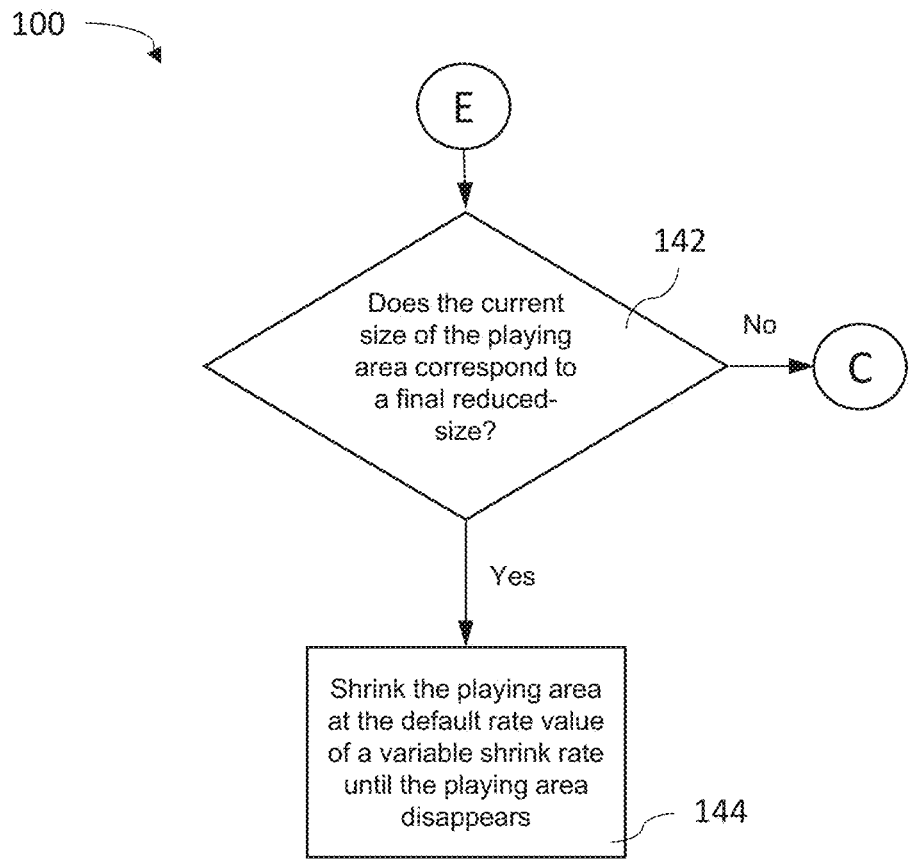

As per steps 136 and 138 of FIG. 1e, the playing area is maintained in the second reduced-size 232 for a default time period (of the variable time interval) if it is determined that the number of surviving players (e.g., four) is more than the second threshold value. Alternatively, the playing area is maintained in the second reduced-size 232 for a shortened time period (of the variable time interval) if it is determined that the number of surviving players (e.g., four) is less than or equal to the second threshold value. The use of the shortened time period advantageously accelerates the overall pace of the game by reducing the waiting time in-between shrinking operations, which translates to better player engagement, less lull moments, and improved enjoyment factor of the game.

As shown in FIG. 2c, the broken line circle depicts the area previously occupied by the playing area in the first reduced-size 231 and the solid line circle depicts the current area occupied by the playing area in the second reduced-size 232.

Figure 2D:
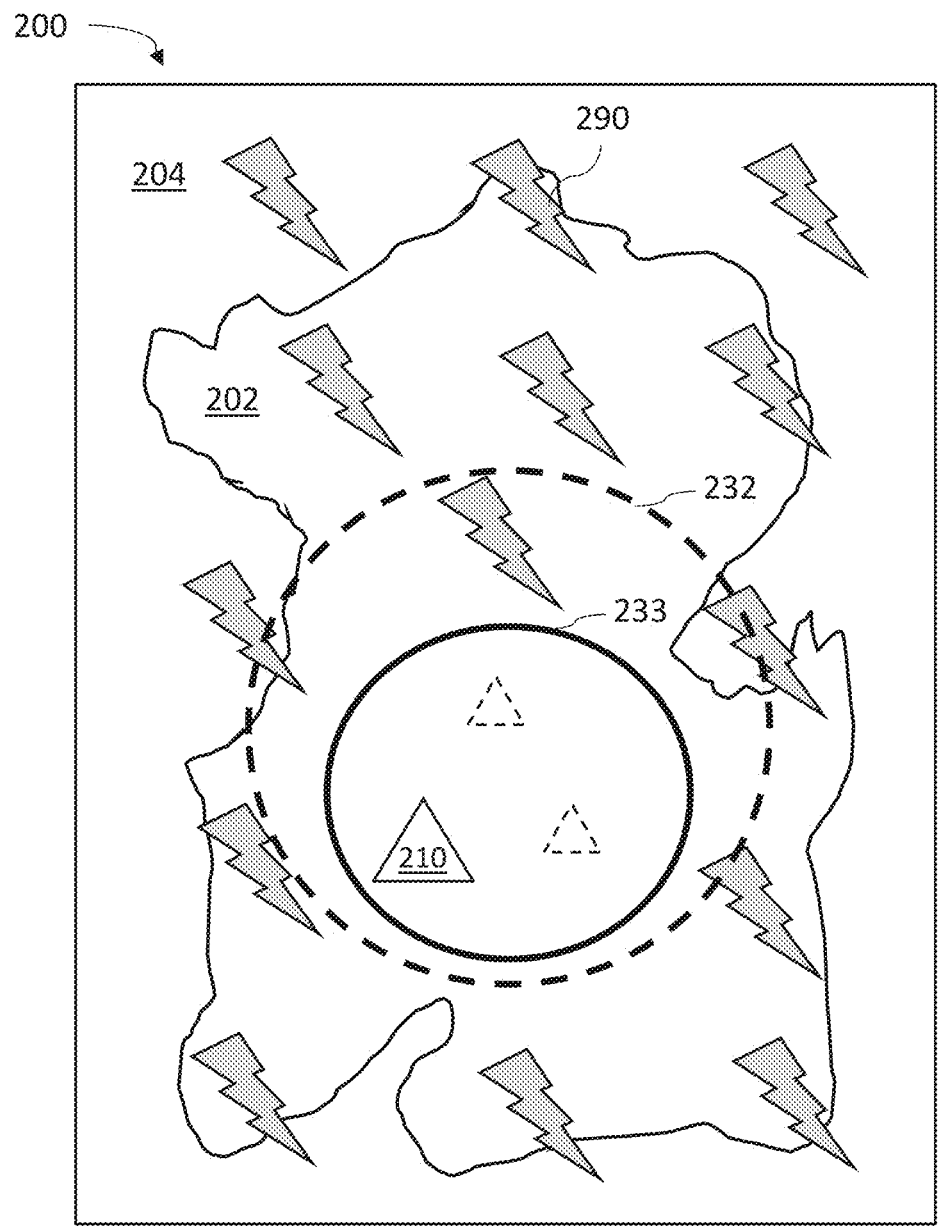

Referring to FIG. 2d, the method monitors a timer to determine when the variable time interval (e.g., the default time period or the shortened period, as the case may be) elapses from the start of maintaining the playing area in the second reduced-size 232. In one embodiment, the second reduced-size 232 is not a predetermined final reduced-size of the playing area. In such a case, at the end of the default time period or the shortened period, the method determines that a third shrink operation to further shrink the playing area is to be initiated. In some embodiments, the invention proceeds to determine whether the number of players currently alive in the game is less than or equal to an associated threshold value when it is determined that a third shrink operation is to be initiated. In this example, the number of surviving players has decreased to three when it is determined that a third shrink operation is to be initiated.

As per steps 128 and 130 of FIG. 1d, the third shrink operation is performed with the default shrink rate if it is determined that the number of surviving players (e.g., three) is more than a third threshold value. Alternatively, the third shrink operation is performed with the increased shrink rate if it is determined that the number of surviving players is less than or equal to the third threshold value. The use of the increased shrink rate to perform the shrink operation advantageously confines the players to a smaller playing area at a faster pace, thereby promoting player engagement while mitigating lull moments, and increasing the enjoyment factor of the game.

The invention monitors the third shrink operation to determine when the playing area has completed shrinking from the second reduced-size 232 to the third reduced-size 233. For example, the playing area temporarily stops shrinking immediately after the third shrink operation is completed. When it is determined that the playing area has completed shrinking to the third reduced-size 233, the invention proceeds to determine whether the number of players currently alive in the game is less than or equal to an associated threshold value. The associated threshold value for the third reduced-size 233 may be the same as the associated threshold value for the third shrink operation. For example, the associated threshold value is the third threshold value (of the set of threshold values).

As per steps 136 and 138 of FIG. 1e, the playing area is maintained in the third reduced-size 233 for a default time period (of the variable time interval) if it is determined that the number of surviving players (e.g., three) is more than the third threshold value. Alternatively, the playing area is maintained in the third reduced-size 233 for a shortened time period (of the variable time interval) if it is determined that the number of surviving players (e.g., three) is less than or equal to the third threshold value. The use of the shortened time period advantageously accelerates the overall pace of the game by reducing the waiting time in-between shrinking operations, which translates to better player engagement, less lull moments, and improved enjoyment factor of the game.

As shown in FIG. 2d, the broken line circle depicts the area previously occupied by the playing area in the second reduced-size 232 and the solid line circle depicts the current area occupied by the playing area in the third reduced-size 233.

Figure 2E:
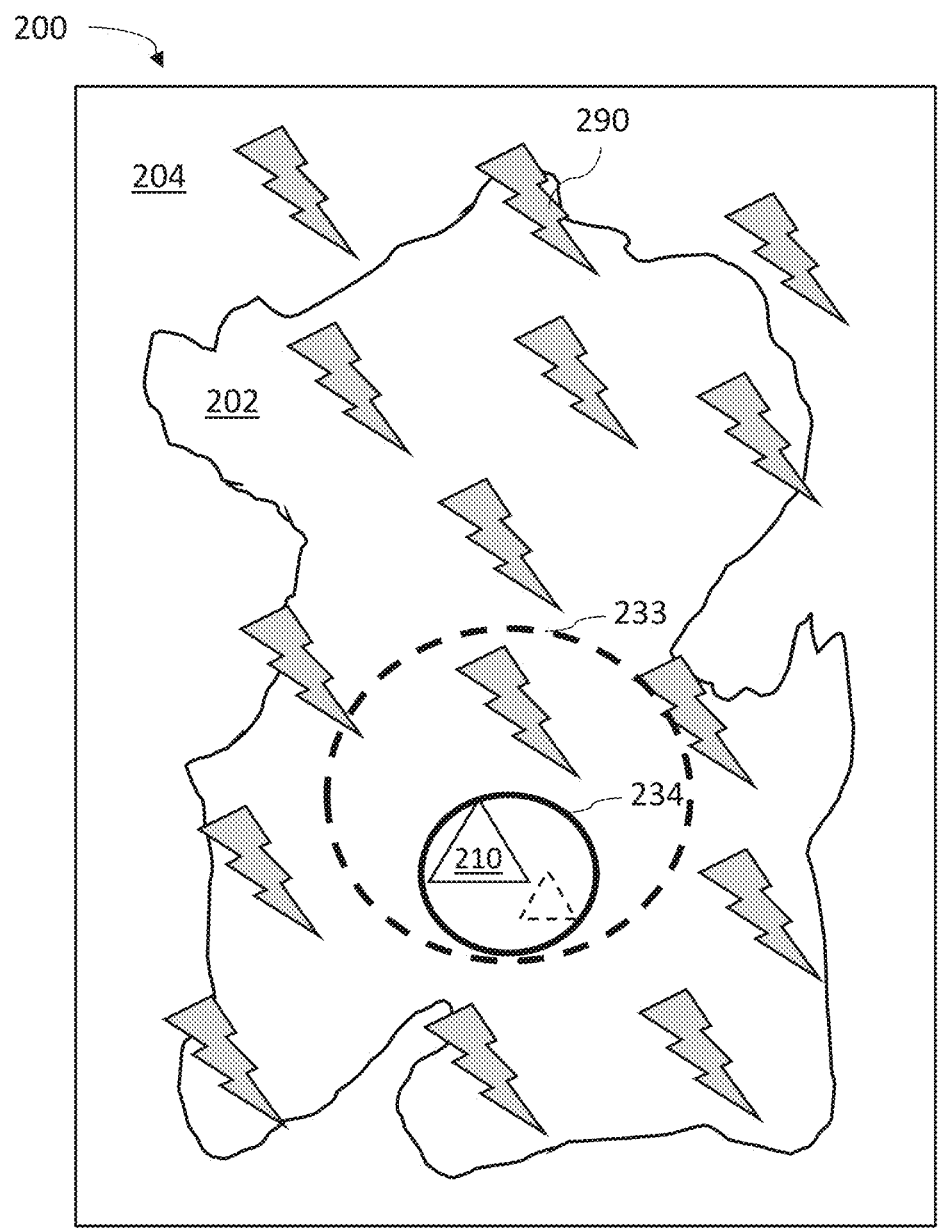

Referring to FIG. 2e, the method monitors a timer to determine when the variable time interval (e.g., the default time period or the shortened period, as the case may be) elapses from the start of maintaining the playing area in the third reduced-size 233. In one embodiment, the third reduced-size 233 does not correspond to a predetermined final reduced-size of the playing area. In such case, at the end of the default time period or the shortened period, the method determines that a fourth shrink operation to further shrink the playing area is to be initiated. In some embodiments, the invention proceeds to determine whether the number of players currently alive in the game is less than or equal to an associated threshold value when it is determined that a fourth shrink operation is to be initiated. In this example, the number of surviving players has decreased to two when it is determined that a fourth shrink operation is to be initiated.

As per steps 128 and 130 of FIG. 1d, the fourth shrink operation is performed with the default shrink rate if it is determined that the number of surviving players (e.g., two) is more than a fourth threshold value. Alternatively, the third shrink operation is performed with the increased shrink rate if it is determined that the number of surviving players is less than or equal to the fourth threshold value. The use of the increased shrink rate to perform the shrink operation advantageously confines the players to a smaller playing area at a faster pace, thereby promoting player engagement while mitigating lull moments, and increasing the enjoyment factor of the game.

The invention monitors the fourth shrink operation to determine when the playing area has completed shrinking from the third reduced-size 233 to the fourth reduced-size 234. For example, the playing area temporarily stops shrinking immediately after the fourth shrink operation is completed. When it is determined that the playing area has completed shrinking to the fourth reduced-size 234, the invention proceeds to determine whether the number of players currently alive in the game is less than or equal to an associated threshold value. The associated threshold value for the fourth reduced-size 234 may be the same as the associated threshold value for the fourth shrink operation. For example, the associated threshold value is the fourth threshold value (of the set of threshold values).

As per steps 136 and 138 of FIG. 1e, the playing area is maintained in the fourth reduced-size 234 for a default time period (of the variable time interval) if it is determined that the number of surviving players (e.g., two) is more than the fourth threshold value. Alternatively, the playing area is maintained in the fourth reduced-size 234 for a shortened time period (of the variable time interval) if it is determined that the number of surviving players (e.g., two) is less than or equal to the fourth threshold value. The use of the shortened time period advantageously accelerates the overall pace of the game by reducing the waiting time in-between shrinking operations, which translates to better player engagement, less lull moments, and improved enjoyment factor of the game.

As shown in FIG. 2e, the broken line circle depicts the area previously occupied by the playing area in the third reduced-size 233 and the solid line circle depicts the current area occupied by the playing area in the fourth reduced-size 234.

Figure 2F:
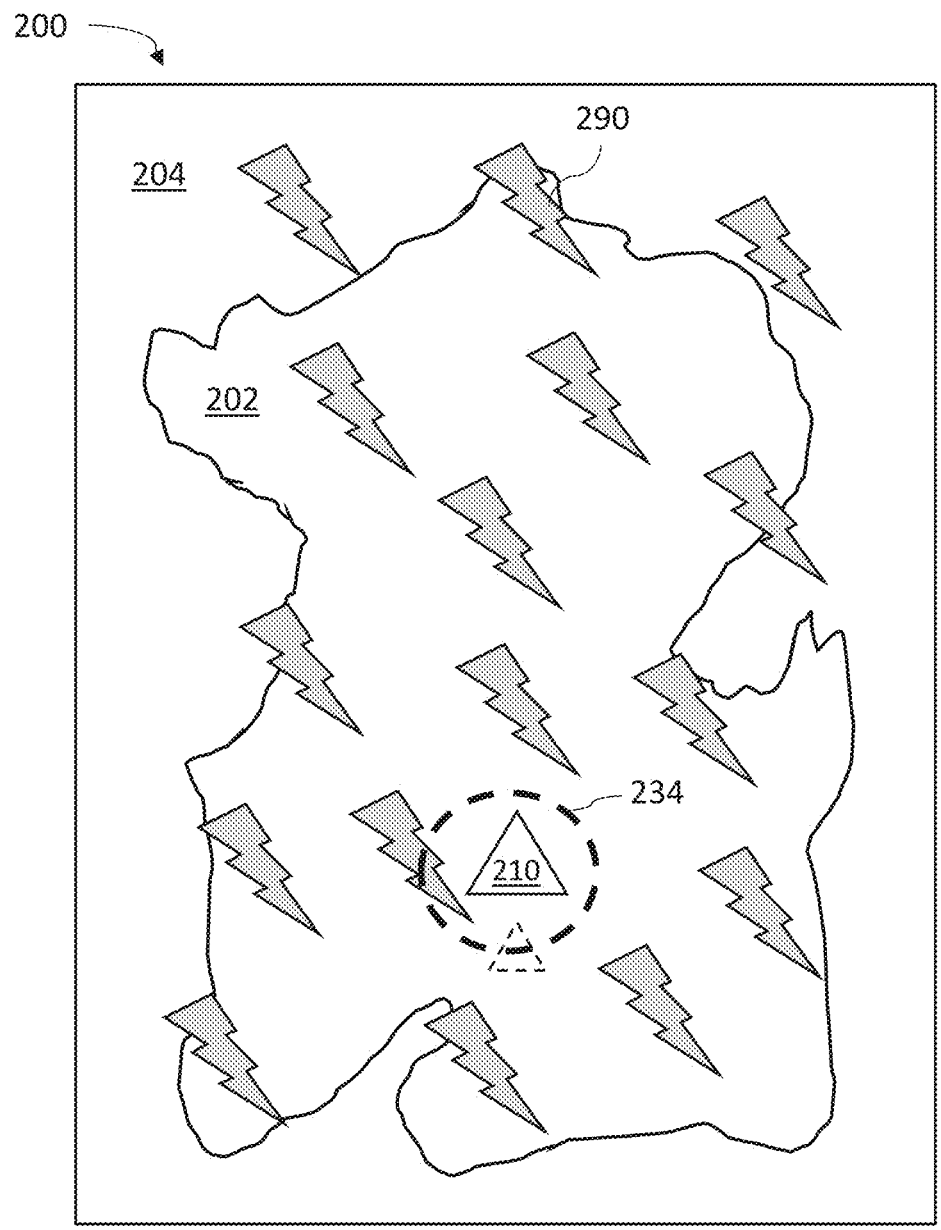

Referring to FIG. 2f, the method monitors a timer to determine when the variable time interval (e.g., the default time period or the shortened period, as the case may be) elapses from the start of maintaining the playing area in the fourth reduced-size 234. In one embodiment, the fourth reduced-size 234 corresponds to a predetermined final reduced-size of the playing area. In such case, at the end of the default time period or the shortened period, the method determines that a final shrink operation is to be initiated and the invention proceeds to shrink the playing area at the default rate value of the variable shrink rate. For example, the invention performs a last shrink operation to shrink the playing area from the fourth reduced-size 234 until it eventually disappears from the map (or game environment).

As shown in FIG. 2f, the broken line circle depicts the area previously occupied by the playing area in the fourth reduced-size 234.

As described in FIGS. 2a-2f, the invention determines the number of surviving players at (or immediately before) the time of performing a specific shrink operation to conditionally increase the shrink rate of the specific shrink operation based on the determined number of surviving players. In addition, the invention also determines the number of surviving players at (or immediately after) the completion of a specific shrink operation to conditionally shorten the waiting time to perform the next shrink operation based on the determined number of surviving players. By taking into account the number of surviving players at the start and the end of each shrink operation in the discontinuous shrinking process, the method is able to readily accelerate the shrinking of the playing area when necessary to facilitate engagements (or encounters) between surviving players. This is especially beneficial in instances when the number of surviving players is decreasing at a rate that is faster than can be anticipated during a match.

The present invention may be implemented in a game that may be operable using a variety of devices or game systems. For example, a device may be a personal computer, a home entertainment system, a portable gaming device, or a mobile computing device. The present methodologies described herein are fully intended to be operable on a variety of devices or game systems. Any hardware platform suitable for performing the methodologies described here is suitable for use with the invention. Computer-readable storage media refer to any medium or media that participate in providing instructions to a CPU for execution. Such media can take many forms, such as but not limited to, non-volatile and volatile media including optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Unless specifically stated otherwise, and as apparent from the following, it will be appreciated that throughout the present specification, discussions utilizing terms such as "receiving", "identifying", "initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method for shrinking an area in battle royale games, the method comprising:
   generating, within a graphical user interface presented on a display of a user device, a map of a gaming environment comprising a playing area configured to shrink discontinuously at a variable shrinking rate, the variable shrinking rate having a default rate value;
   determining that a shrink operation of the playing area is to be initiated;
   in response to determining that the shrink operation of the playing area is to be initiated, determining whether a number of players alive in the gaming environment at a time when the shrink operation of the playing area is to be initiated, is equal to or lower than a threshold value;
   in response to determining that the number of players alive in the gaming environment at the time when the shrink operation of the playing area is to be initiated is equal to or lower than the threshold value, increasing the variable shrink rate to a rate value greater than the default rate value;

shrinking the playing area from a first configuration to a second configuration in accordance with the increased variable shrink rate over a period of time, wherein a speed at which the playing area shrinks from the first configuration to the second configuration in accordance with the increased variable shrink rate is faster than a speed at which the playing area shrinks from the first configuration to the second configuration in accordance with the default rate value of the variable shrinking rate; and wherein the graphical user interface presented within the display of the user device presents the shrinking of the playing area of the map from the first configuration to the second configuration in accordance with the increased variable shrink rate.

2. The method of claim 1, wherein the playing area is further configured to remain in the second configuration for a variable time interval having a default time period after completing the shrinking to the second configuration, the method further comprising:

determining that the playing area has completed shrinking to the second configuration;

in response to determining that the playing area has completed shrinking to the second configuration, determining whether a number of players alive in the gaming environment at a time when the playing area has completed shrinking to the second configuration, is equal to or lower than the threshold value;

in response to determining that the number of players alive in the gaming environment at the time when the playing area has completed shrinking to the second configuration is equal to or lower than the threshold value, shortening the variable time interval to a time period shorter than the default time period to obtain a shortened time period; and maintaining the playing area in the second configuration for the shortened time period.

3. The method of claim 2, wherein the shortened time period is at least 0.5 times less than the default time period.

4. The method of claim 1, wherein the shrink operation is a first shrink operation of a plurality of shrink operations to be performed during a match.

5. The method of claim 4, wherein determining that the first shrink operation of the playing area is to be initiated comprises:

determining when a predetermined time period from a start of the match elapses; and in response to determining that the predetermined time period has elapsed from the start of the match, determining that the first shrink operation is to be initiated.

6. The method of claim 1, wherein the threshold value is a value selected from a plurality of threshold values.

7. The method of claim 6, wherein each of the plurality of threshold values is associated with a different shrink operation of a plurality of shrink operations.

8. The method of claim 1, wherein the shrink operation is a second shrink operation of a plurality of shrink operations to be performed during a match, and the playing area is being maintained in the first configuration for a variable time interval.

9. The method of claim 8, wherein determining that the second shrink operation of the playing area is to be initiated comprises:

determining when the variable time interval elapses; and in response to determining that the variable time interval has elapsed, determining that the second shrink operation is to be initiated.

10. The method of claim 1, wherein the second configuration of the playing area is within an area previously occupied by the first configuration of the playing area.

11. The method of claim 1, wherein the rate value of the increased variable shrink rate is at least 2 times faster than the default rate value.

12. The method of claim 1, wherein the first configuration of the playing area comprises a circle shape having a first size and the second configuration of the playing area comprises a circle shape having a second size smaller than the first size.

13. A system comprising one or more computers and one or more storage devices storing computer-readable instructions that, when executed by the one or more computers, cause the one or more computers to perform one or more operations comprising:

generating, within a graphical user interface presented on a display of a user device, a map of a gaming environment comprising a playing area configured to shrink discontinuously at a variable shrinking rate, the variable shrinking rate having a default rate value;

determining that a shrink operation of the playing area is to be initiated;

in response to determining that the shrink operation of the playing area is to be initiated, determining whether a number of players alive in the gaming environment at a time when the shrink operation of the playing area is to be initiated, is equal to or lower than a threshold value;

in response to determining that the number of players alive in the gaming environment at the time when the shrink operation of the playing area is to be initiated is equal to or lower than the threshold value, increasing the variable shrink rate to a rate value greater than the default rate value;

shrinking the playing area from a first configuration to a second configuration in accordance with the increased variable shrink rate over a period of time, wherein a speed at which the playing area shrinks from the first configuration to the second configuration in accordance with the increased variable shrink rate is faster than a speed at which the playing area shrinks from the first configuration to the second configuration in accordance with the default rate value of the variable shrinking rate; and wherein the graphical user interface presented within the display of the user device presents the shrinking the playing area of the map from the first configuration to the second configuration in accordance with the increased variable shrink rate.

14. The system of claim 13, wherein the playing area is further configured to remain in the second configuration for a variable time interval having a default time period after completing the shrinking to the second configuration, and wherein the one or more computers are further configured to perform operations comprising:

determining that the playing area has completed shrinking to the second configuration;

in response to determining that the playing area has completed shrinking to the second configuration, determining whether a number of players alive in the gaming environment at a time when the playing area has completed shrinking to the second configuration, is equal to or lower than the threshold value;

in response to determining that the number of players alive in the gaming environment at the time when the playing area has completed shrinking to the second configuration is equal to or lower than the threshold value, shortening the variable time interval to a time period shorter than the default time period to obtain a shortened time period; and maintaining the playing area in the second configuration for the shortened time period.

15. The system of claim 13, wherein the shrink operation is a first shrink operation of a plurality of shrink operations to be performed during a match.

16. The system of claim 15, wherein determining that the first shrink operation of the playing area is to be initiated comprises:
   determining when a predetermined time period from a start of the match elapses; and
   in response to determining that the predetermined time period has elapsed from the start of the match, determining that the first shrink operation is to be initiated.

17. The system of claim 13, wherein the threshold value is a value selected from a plurality of threshold values.

18. The system of claim 17, wherein each of the plurality of threshold values is associated with a different shrink operation of a plurality of shrink operations.

19. The system of claim 13, wherein the shrink operation is a second shrink operation of a plurality of shrink operations to be performed during a match, and the playing area is being maintained in the first configuration for a variable time interval.

20. One or more non-transitory computer storage media storing instructions that, when executed by one or more computers, cause the one or more computers to perform one or more operations comprising:
   generating, within a graphical user interface presented on a display of a user device, a map of a gaming environment comprising a playing area configured to shrink discontinuously at a variable shrinking rate, the variable shrinking rate having a default rate value;
   determining that a shrink operation of the playing area is to be initiated;
   in response to determining that the shrink operation of the playing area is to be initiated, determining whether a number of players alive in the gaming environment at a time when the shrink operation of the playing area is to be initiated, is equal to or lower than a threshold value;
   in response to determining that the number of players alive in the gaming environment at the time when the shrink operation of the playing area is to be initiated is equal to or lower than the threshold value, increasing the variable shrink rate to a rate value greater than the default rate value;
   shrinking the playing area from a first configuration to a second configuration in accordance with the increased variable shrink rate over a period of time, wherein a speed at which the playing area shrinks from the first configuration to the second configuration in accordance with the increased variable shrink rate is faster than a speed at which the playing area shrinks from the first configuration to the second configuration in accordance with the default rate value of the variable shrinking rate; and
   wherein the graphical user interface presented within the display of the user device presents the shrinking of the playing area of the map from the first configuration to the second configuration in accordance with the increased variable shrink rate.

* * * * *